United States Patent
Carrot

Patent Number: 5,259,574
Date of Patent: Nov. 9, 1993

[54] SAFETY DEVICE FOR HELICOPTERS AND SIMILAR EQUIPMENT WITH ROTORS

[76] Inventor: Louis Carrot, La Mare aux Fées, 42530 Saint Genest Lerpt, France

[21] Appl. No.: 838,426
[22] PCT Filed: May 17, 1991
[86] PCT No.: PCT/FR91/00399
§ 371 Date: Mar. 6, 1992
§ 102(e) Date: Mar. 6, 1992
[87] PCT Pub. No.: WO92/00876
PCT Pub. Date: Jan. 23, 1992

[30] Foreign Application Priority Data
Jul. 6, 1990 [FR] France .................. 90 09064

[51] Int. Cl.⁵ .................. B64C 25/04; B64D 45/04
[52] U.S. Cl. .................. 244/100 A; 244/107; 244/139
[58] Field of Search .......... 244/118.1, 17.15, 100 A, 244/101, 105, 107, 108, 139; 180/124, 127

[56] References Cited

U.S. PATENT DOCUMENTS

| | | | |
|---|---|---|---|
| 2,621,874 | 12/1952 | Boyle | 244/10.1 |
| 3,131,888 | 5/1964 | Jensen et al. | 244/17.17 |
| 3,507,466 | 4/1970 | La Fleur | 224/105 |
| 3,869,103 | 3/1975 | Nelson et al. | 180/124 |
| 3,901,988 | 8/1975 | Coles et al. | 244/100 |
| 4,004,761 | 1/1977 | McAvoy | 244/100 A |
| 4,019,698 | 4/1977 | Earl | 244/100 A |
| 4,298,175 | 11/1981 | Earl | 244/101 |
| 4,655,415 | 4/1987 | Miller et al. | 244/100 A |
| 4,923,145 | 5/1990 | Broadhurst | 244/100 A |

FOREIGN PATENT DOCUMENTS 91660 10/1983 European Pat. Off. .
2826619 4/1970 Fed. Rep. of Germany .
90266 11/1965 France .

*Primary Examiner*—David A. Bucci
*Assistant Examiner*—Virna Lissi Ansley
*Attorney, Agent, or Firm*—Eckert Seamans Cherin & Mellott

[57] ABSTRACT

A device for protecting a helicopter and its occupants from damage during a crash or difficult landing. The device includes an inflatable bag attached to the bottom fuselage which covers a totality of the surface of the helicopter's bottom fuselage. The bag is inflatable into a trapezoidal shape having a very large volume, exceeding the helicopter's internal volume, for substantially cushioning the helicopter upon impact with the ground during a crash. The bag is equipped with distortion-control reinforcements for preventing toppling of the helicopter after a landing and bag air-pressure controlling and limiting devices.

9 Claims, 3 Drawing Sheets

SAFETY DEVICE FOR HELICOPTERS AND SIMILAR EQUIPMENT WITH ROTORS

The invention pertains to the technical field of safety and protective devices for helicopters and which are designed to avoid violent landings.

The press regularly reports on accidents involving helicopters that crash to the ground following mechanical malfunctions or failure of lift occurring at an altitude lower than capable of inducing autorotation. Under such circumstances, helicopters reach an impact velocity with the ground or water that generates a fatal deceleration and crash.

Various relevant applications have proposed explosive parachutes comprising shock absorber devices in the form of inflatable means.

Also known is the use of inflatable means applicable under the frames of airplanes, so as to make possible gentle landings. These inflatable means are equipped with landing skids designed to assure progressive and complete braking of airplanes equipped with these means.

It is also known to use inflatable means on airplanes and helicopters attached to their underframe or support zone so as to create water flotation zones.

Nevertheless, none of these known devices with inflatable means are suitable for protecting with complete safety helicopters in the case of dives or crashes.

Thus, the goal of the invention was to investigate and find a solution making it possible to assure the safety, protection and survival of the personnel on board helicopters by limiting the effect of the impact by means of progressive and controlled cushioning of the helicopter during the dive or crash.

These and other goals will be presented in the description that follows.

In accordance with a first characteristic, the safety device of helicopters and equipment with rotors is remarkable in that it comprises an inflatable bag attached under the bottom fuselage, with its to part covering the totality of the surface of the helicopter's bottom fuselage, and having in the inflated position of use a trapezoidal shape of very large volume exceeding very greatly the volume defined by the helicopter, thus augmenting the support polygon, with the said bag being equipped on its sides with distortion-control reinforcement means and means for limiting and controlling the inside pressure.

In accordance with another characteristic, the bag is equipped with pressure-limiting means constituted by vents located in the top zone and the bottom zone of the bag, which vents make it possible to regulate the actual pressure while preserving a minimum residual pressure to permit flotation.

These and other characteristics will be presented in the description below.

The object of the invention is illustrated in a nonlimitative manner in the drawings, in which.

Figure 1:
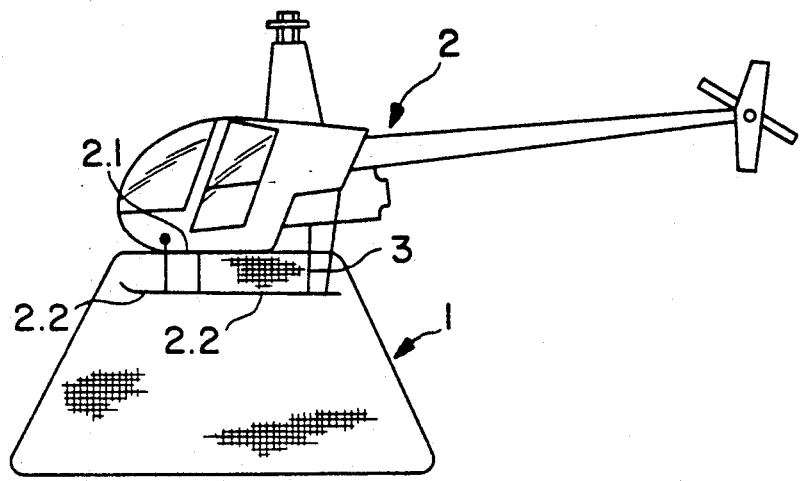
FIG. 1 is a schematic drawing showing a side view of a helicopter equipped with the safety device which is the object of the invention in the deployed position.
Figure 2:
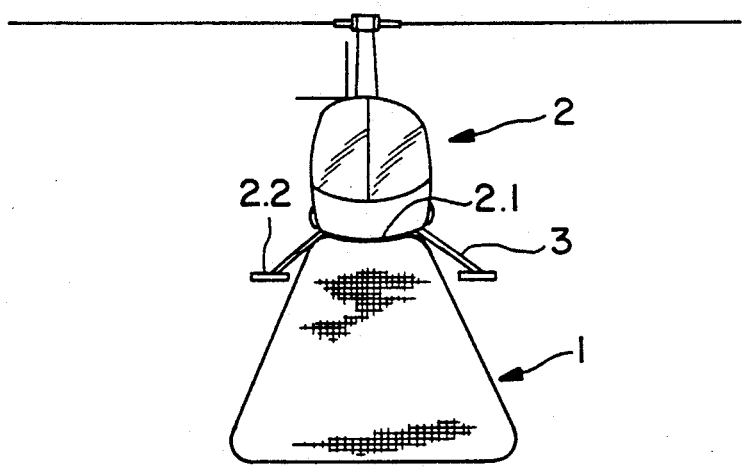
FIG. 2 is similar to FIG. 1 in front view.
Figure 3:
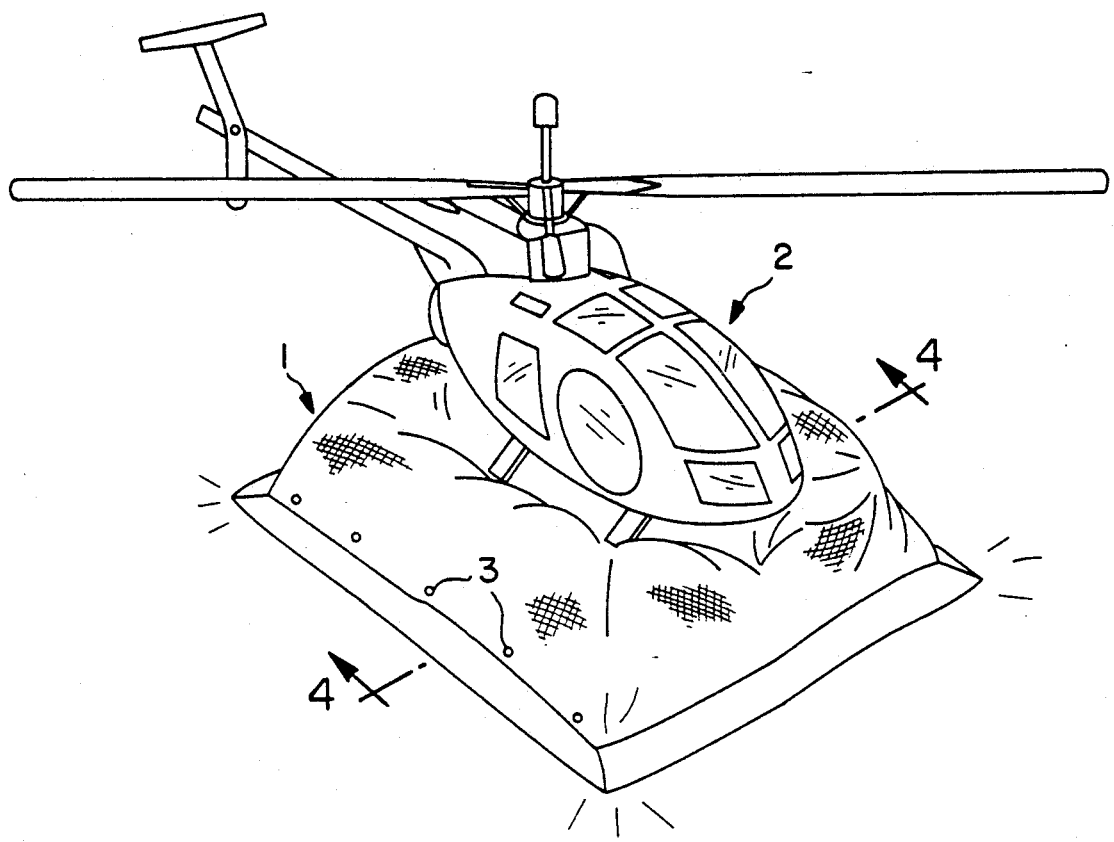
FIG. 3 is a perspective view showing the position of the helicopter and the safety device after a crash.
Figure 4:
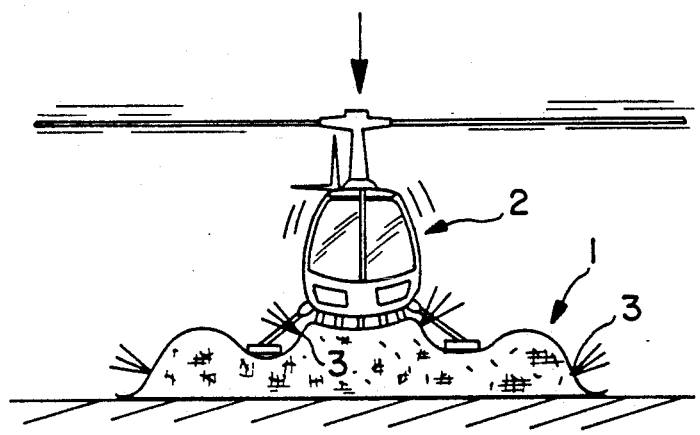
FIG. 4 is a cross-sectional view along line 4-4 of FIG. 3.
Figure 6:
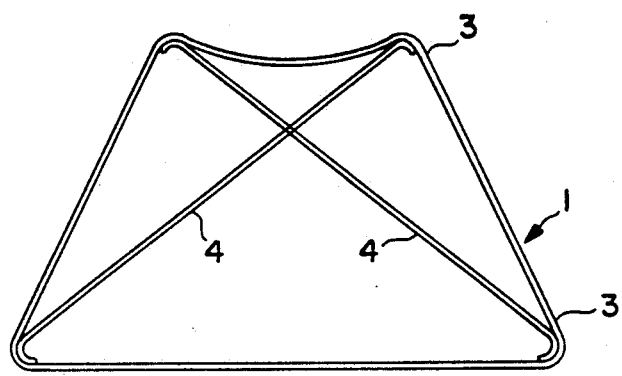
FIG. 6 is a side view of FIG. 5.

In order to increase the specificity of the object of the invention, it will now be described in a nonlimitative manner with reference to the implementation examples shown in the drawings.

Reference (2) designates a helicopter the bottom fuselage (2.1) of which is equipped to receive an inflatable bag (1). This ba is attached to the bottom part of the helicopter between the elements constituting its support underframe (2.2). This bag is made of any suitable, highly sturdy material, particularly cloth comprised of aramid fibers such as those sold under the trademark "Kevlar". Thus, this bag is very sturdy so as to be able to handle the pressures exerted on it during inflation and under the conditions of impact with the ground or water so as to assure a cushioning effect. The top part of this bag covers the totality of the surface of the helicopter's bottom fuselage so as to have a maximum contact surface. In use in the inflated position, this bag is deployed so as to have a trapezoidal shape with a very large volume so as to define an impact plane surface area that is much larger than the initial surface area of the helicopter's fuselage. In the deployed position, this bag exceeds very greatly the volume defined by the helicopter itself by constituting a cushioning mattress of very large dimensions, thus increasing the support polygon which makes possible enhanced cushioning upon impact.

Figure 5:
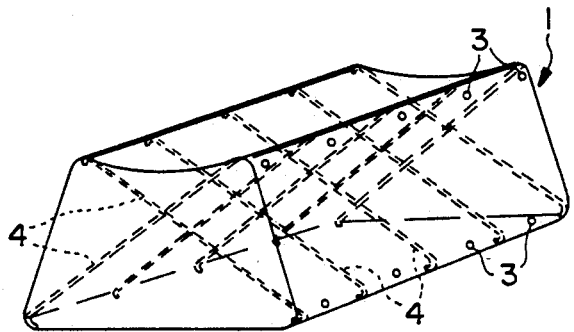
FIG. 5 is a perspective view of the inflatable bag with illustration of the reinforcement means.

In order to provide the bag in the deployed position with a certain stability, the bag is equipped internally and notably close to its opposite lateral sides and on all or a portion of its length with reinforcement zone that have been carefully positioned so as to eliminate distortion of the bag. This reinforcements, illustrated by reference (4), are strips that can be made of aramid-fiber type material and which are positioned and attached, e.g., by stitching or other means, to the top and bottom opposite angle parts of the bag so as to define an intertwining by alteration of position, such as, for example, shown in FIG. 5. These reinforcements positioned inside of the bag thus make it possible to assure a distortion-control function and to preserve the initial trapezoidal shape of the bag after inflation. These reinforcements can also be constituted, e.g., of strips located on the peripheral circumference of the bag's lateral sides and positioned in an intertwining manner.

In order to assure constant protection, the gas pressure in the bag is limited and controlled by pressure-limiting means. These means are, e.g., vents (3) which are positioned to the top and bottom zones of the bag and which make it possible to regulate the pressure in the bag during the phase in which the helicopter drops and crashes to the ground. These vents are controlled by any suitable means that still make it possible to preserve a minimum amount of residual pressure in the bag so as to allow its flotation. The gas pressure in the bag is thus limited and controlled by the said vents.

Figure 7:
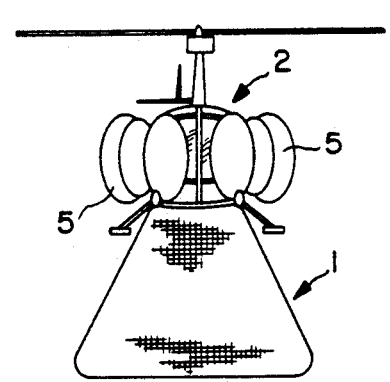
FIGS. 7 and 8 are schematic drawings showing the addition of supplementary safety means laterally on the helicopter fuselage.
Figure 8:
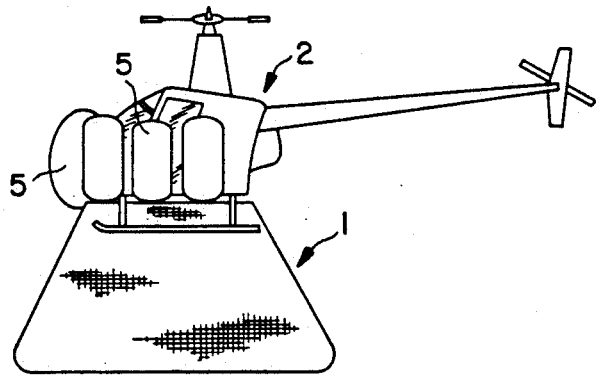
Figure 9:
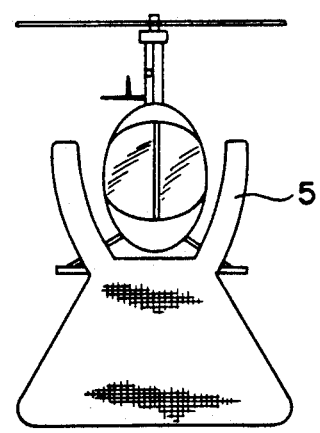
FIG. 9 is a partial view of FIG. 7 showing the shape of the bag with addition of the aforementioned supplementary means.

In accordance with another implementation shown in FIGS. 7, 8, and 9, the helicopter is equipped with supplementary bags (5) which can be deployed laterally and, in combination with the principal bag, protect the totality of the helicopter.

Advantageously, as shown in FIG. 9, the aforementioned bags form a single unit with communication of pressure between the trapezoidal bag located under the fuselage and the additional bags positioned laterally around the helicopter's fuselage. In this case, the vents can be located in the top part of the additional bags so as to make it possible to control and evacuate gas during the landing and thereby facilitate a gentle and progressive landing of the helicopter in the case of a crash.

I claim:

1. Safety device for helicopters and equipment with rotors, comprising: a principal inflatable bag having top and bottom zones, the bag being attached under a bottom fuselage of a helicopter such that the top zone of the inflatable bag covers a whole surface of the bottom fuselage, the bag when inflated defining a trapezoidal shape of very large volume exceeding very greatly an internal volume of the helicopter, said bag being equipped on its sides with distortion-control reinforcement means, and means for limiting and controlling an interior pressure in the bag.

2. Device in accordance with claim 1, wherein the bag comprises cloth constituted of aramid fibers.

3. Device in accordance with claim 1, wherein the bag is equipped with pressure-limiting means comprising located in the top and bottom zones of the bag, said vents being arranged to regulate the interior pressure while preserving a minimum amount of residual interior pressure sufficient to allow flotation.

4. Device in accordance with claim 1, further comprising additional bags deployed on lateral sides of the helicopter, said bags being connected to the principal bag for simultaneous inflation with the principal bag, the principal bag and the additional bags providing downward and lateral cushioning in the case of the helicopter crashing.

5. Device in accordance with claim 1, wherein the distortion-control reinforcement means comprise strips positioned and attached inside the principal bag in alternating intertwined positions.

6. Device in accordance with claim 5, wherein strips comprise aramid fibers.

7. Device in accordance with claim 5, wherein the strips are attached on opposite lateral sides of the bag.

8. Device in accordance with claim 3, wherein the pressure-limiting means are positioned in a top part of the additional bags, and in the bottom zone of the principal bag.

9. Device in accordance with claim 3, wherein the pressure-limiting means are positioned in a top part of the additional bags, and int he bottom zone of the principal bag, and wherein the distortion-control reinforcement means comprise strips positioned and attached inside the principal bag n alternating intertwined positions.

* * * * *

UNITED STATES PATENT AND TRADEMARK OFFICE
CERTIFICATE OF CORRECTION

PATENT NO. : 5,259,574
DATED : November 9, 1993
INVENTOR(S) : Louis Carrot

It is certified that error appears in the above-indentified patent and that said Letters Patent is hereby corrected as shown below:

Column 1, line 42, replace "to" with --top--.

Column 2, line 16, replace "ba" with --bag--.

<u>In the claims</u>

Column 3, line 28, insert --vents-- before "located".

Column 4, line 24, change "int he" to read --in the--.

Column 4, line 27, change "n" to read --in--.

Signed and Sealed this

Third Day of May, 1994

Attest:

BRUCE LEHMAN

*Attesting Officer*  *Commissioner of Patents and Trademarks*